United States Patent [19]

Wu et al.

[11] Patent Number: 5,905,051
[45] Date of Patent: May 18, 1999

[54] HYDROTREATING CATALYST COMPOSITION AND PROCESSES THEREFOR AND THEREWITH

[76] Inventors: An-hsiang Wu, 854 Concord Dr., Bartlesville, Okla. 74006; Charles A. Drake, Rte. 1, Box 206, Nowata, Okla. 74048

[21] Appl. No.: 08/868,727

[22] Filed: Jun. 4, 1997

[51] Int. Cl.⁶ ............................ B01J 29/04; B01J 29/06; B01J 21/00; B01J 21/16
[52] U.S. Cl. .......................... 502/60; 502/60; 502/61; 502/63; 502/64; 502/67; 502/68; 502/71; 502/74; 502/76; 502/77; 502/80; 502/101
[58] Field of Search ............................ 502/60, 61, 63, 502/64, 66, 67, 68, 71, 74, 76, 77, 80, 101

[56] References Cited

U.S. PATENT DOCUMENTS

| | | | |
|---|---|---|---|
| 3,308,069 | 3/1967 | Wadlinger et al. | 252/455 |
| 3,945,913 | 3/1976 | Brennan et al. | 208/137 |
| 3,950,241 | 4/1976 | Bonacci et al. | 208/64 |
| 4,078,990 | 3/1978 | Brennan et al. | 208/64 |
| 4,091,007 | 5/1978 | Dwyer et al. | 260/448 C |
| 4,257,872 | 3/1981 | La Pierre et al. | 208/59 |
| 4,443,326 | 4/1984 | Field | 208/64 |
| 4,808,295 | 2/1989 | Nemet-Mavrodin | 208/62 |
| 4,992,400 | 2/1991 | Marcilly et al. | 502/67 |
| 5,030,787 | 7/1991 | Absil et al. | 585/475 |
| 5,037,529 | 8/1991 | Dessau et al. | 208/64 |
| 5,041,401 | 8/1991 | Schoennagel et al. | 502/61 |
| 5,053,374 | 10/1991 | Absil et al. | 502/64 |
| 5,177,287 | 1/1993 | Sato et al. | 585/481 |
| 5,182,242 | 1/1993 | Marler | 502/66 |
| 5,219,814 | 6/1993 | Kirker et al. | 502/66 |
| 5,252,197 | 10/1993 | Alexander et al. | 208/134 |
| 5,358,631 | 10/1994 | Miller et al. | 208/138 |
| 5,376,259 | 12/1994 | Kline et al. | 208/65 |
| 5,391,288 | 2/1995 | Collins et al. | 208/89 |
| 5,407,558 | 4/1995 | Kline et al. | 208/65 |
| 5,430,000 | 7/1995 | Timken | 502/60 |
| 5,494,870 | 2/1996 | Kukes et al. | 502/66 |
| 5,516,956 | 5/1996 | Abichandani et al. | 585/481 |
| 5,552,035 | 9/1996 | Potter et al. | 208/135 |
| 5,558,851 | 9/1996 | Miller | 423/702 |
| 5,602,066 | 2/1997 | Beck et al. | 502/64 |

FOREIGN PATENT DOCUMENTS 1343172 1/1974 United Kingdom ............. C07C 3/58

*Primary Examiner*—Gary P. Straub
*Assistant Examiner*—Cam N. Nguyen
*Attorney, Agent, or Firm*—Lucas K. Shay

[57] ABSTRACT

A catalyst system and a process for converting a hydrocarbon stream such as, for example, a $C_9$+aromatic compound to $C_6$ to $C_8$ aromatic hydrocarbons such as xylenes are disclosed. The catalyst system comprises a first catalyst composition and a second catalyst composition wherein said catalyst system is not a physical mixture of said first catalyst composition and said second catalyst composition, said first catalyst is a metal-promoted, alumina- or silica-bound beta zeolite, and said second catalyst composition is a ZSM-5 zeolite having incorporated therein an activity promoter selected from the group consisting of silicon, phosphorus, sulfur, and combinations of two or more thereof. The process comprises contacting a hydrocarbon stream with the catalyst system under a condition sufficient to effect the conversion of a the hydrocarbon to a $C_6$ to $C_8$ aromatic hydrocarbon.

25 Claims, No Drawings

HYDROTREATING CATALYST COMPOSITION AND PROCESSES THEREFOR AND THEREWITH

FIELD OF THE INVENTION

This invention relates to a catalyst composition useful for converting a hydrocarbon to a $C_6$ to $C_8$ aromatic hydrocarbon, to a process for producing the composition, and to a process for using the composition for converting a hydrocarbon to a $C_6$ to $C_8$ aromatic hydrocarbon.

BACKGROUND OF THE INVENTION

It is well known to those skilled in the art that aromatic hydrocarbons are a class of very important industrial chemicals which find a variety of uses in petrochemical industry. It is also well known to those skilled in the art that catalytically cracking gasoline-range hydrocarbons produces aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5$+alkanes, $C_5$+alkenes, $C_5$+cycloalkanes, or combinations of two or more thereof; lower alkanes such as methane, ethane, and propane; lower alkenes such as ethylene and propylene; and $C_9$+aromatic compounds having 9 or more carbon atoms per molecule. Recent efforts to convert gasoline to more valuable petrochemical products have focused on improving the conversion of gasoline to more valuable aromatic hydrocarbons in the presence of zeolite catalysts. For example, a gallium-promoted zeolite ZSM-5 has been used in the so-called Cyclar Process to convert a hydrocarbon to BTX. The aromatic hydrocarbons can be useful feedstocks for producing various organic compounds and polymers. However, heavier, less useful aromatic compounds having 9 or more carbon atoms per molecule ($C_9$+ aromatic compounds) are also produced by the conversion process. Additionally, ethylbenzene co-produced in the conversion of gasoline to aromatic compounds as well as in the conversion of $C_9$+aromatic compounds to BTX is known to interfere with xylene isomerization, is undesirable, and should be removed or reduced. Furthermore, a zeolite catalyst is generally deactivated in a rather short period, especially in a high sulfur and/or polyaromatics environment, because of depositions of carbonaceous material, generally coke, on the surface of the catalyst. Therefore, development of a catalyst and a process for converting a $C_9$+aromatic compound to the more valuable BTX in which the process and catalyst reduce the depositions of the carbonaceous material as well as reduce the ethylbenzene content in the product stream would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon. Also an object of this invention is to provide a process for producing the catalyst composition. Another object of this invention is to provide a process which can employ the catalyst composition to convert a hydrocarbon to a $C_6$ to $C_8$ aromatic hydrocarbon. An advantage of the invention is that it enhances the production of xylenes, reduces ethylbenzene by-product, and suppresses the deposition of coke thereon. Other objects and advantages will becomes more apparent as this invention is more fully disclosed hereinbelow.

According to a first embodiment of the present invention, a composition which can be used as a catalyst for converting a hydrocarbon or a hydrocarbon mixture to a $C_6$ to $C_8$ aromatic hydrocarbon is provided. The composition comprises, consists essentially of, or consists of, a metal-promoted, alumina- or silica-bound zeolite having incorporated therein, or impregnated or coated thereon, a coke-suppressor wherein the metal is selected from the group consisting of nickel, palladium, molybdenum, gallium, platinum, copper, chromium, rhodium, rhenium, tungsten, cobalt, germanium, zirconium, titanium, ruthenium, and combinations of two or more thereof.

According to a second embodiment of the present invention, a process which can be used for producing a catalyst composition is provided. The process comprises the steps: (1) optionally contacting a zeolite with steam whereby a steamed zeolite is formed; (2) optionally contacting the steamed zeolite with an acid in an amount and under a condition effective to reduce the aluminum content of the zeolite to produce an acid-leached zeolite; (3) heating a zeolite, or the steamed zeolite or the acid-leached zeolite, with silica under a condition sufficient to bind the silica to the zeolite to produce a silica-bound zeolite; (4) calcining the silica-bound zeolite to produce a calcined silica-bound zeolite; (5) optionally contacting the calcined silica-bound zeolite with a metal compound whose metal is selected from the group consisting of nickel, palladium, molybdenum, gallium, platinum, tin, chromium, rhodium, rhenium, tungsten, indium, cobalt, germanium, zirconium, titanium, ruthenium, and combinations of two or more thereof under a condition effective to incorporate the metal compound or the metal into the silica-bound zeolite to produce a metal-incorporated zeolite; and (6) optionally treating the metal-incorporated zeolite with a reducing agent under a condition effective to lower the oxidation state of the metal in the metal-promoted zeolite.

According to a third embodiment of the present invention, a process, which can be used for converting a hydrocarbon or a hydrocarbon mixture to a $C_6$ to $C_8$ aromatic hydrocarbon is provided which comprises, consists essentially of, or consists of, the steps of: (1) contacting a fluid with a first catalyst composition under a condition effective to convert a hydrocarbon to an aromatic hydrocarbon containing 6 to 8 carbon atoms per molecule to produce a first product stream wherein the fluid comprises a hydrocarbon or a hydrocarbon mixture and the first catalyst composition can be the same as disclosed above in the first embodiment and can be made by the process disclosed above in the second embodiment of the invention; and optionally, (2) contacting the first product stream with a second catalyst under a condition sufficient to substantially reduce the ethylbenzene content in the first product stream.

DETAILED DESCRIPTION OF THE INVENTION

The catalyst composition of the first embodiment of the present invention comprises a zeolite having incorporated therein, preferably impregnated thereon, a metal in which the metal selected from the group consisting of nickel, palladium, molybdenum, gallium, platinum, chromium, rhodium, rhenium, tungsten, cobalt, germanium, zirconium, titanium, ruthenium, and combinations of two or more thereof. The metal can be, and generally is, chemically bonded to oxygen or sulfur.

According to the present invention, the term "coke" refers to a semi-pure carbon generally deposited on the surface of a metal wall or a catalyst. The term "hydrocarbon" generally has the formula of $RH_z$ in which R is a hydrocarbyl radical having 1 to about 30, preferably 5 to about 25, and most preferably 9 to 16 carbon atoms per molecule; z is a number that fills the necessary valency of R; and the hydrocarbyl radicals can be alkyl radical, aryl radical, alkaryl radical, aralkyl radical, or combinations of any two or more thereof and can be substituted or unsubstituted.

The weight ratio of the silica to the zeolite can be any ratio that is effective to convert a hydrocarbon to an aromatic hydrocarbon. Generally, the weight ratio of silica to zeolite can be in the range of from about 0.002:1 to about 1:1, preferably about 0.005:1 to about 0.8:1, and most preferably 0.006:1 to 0.4:1. The weight ratio of the incorporated metal to zeolite can be any ratio that can enhance the conversion of a hydrocarbon to a BTX and can be in the range of from about 0.0001:1 to about 0.1:1, preferably about 0.0005:1 to about 0.075:1, more preferably about 0.001:1 to about 0.05:1, and most preferably 0.002:1 to 0.03:1.

Alternatively, the weight of silica in the invention composition can be in the range of from about 0.1 to about 50, preferably about 1 to about 40, and most preferably 2 to 40 grams per 100 grams of the composition. The weight of the incorporated metal can be such that is effective to enhance the conversion of a hydrocarbon to BTX and can be in the range of from about 0.001 to about 15, preferably about 0.01 to about 10, and most preferably 0.1 to 5 grams per 100 grams of the composition. The composition can also be characterized by having the following physical characteristics: a micropore surface area, as determined by the BET method using nitrogen, in the range of from about 50 to about 1,000, preferably to 500 $m^2/g$; a micropore pore volume in the range of from about 0.1 to about 2.0, preferably about 0.1 to about 1.0 ml/g; an average micropore pore diameter in the range of from about 0.1 to about 500, preferably about 1 to about 200 Å; and a porosity of more than about 20%.

Any commercially available zeolites can be employed as a starting material of the process of the second embodiment of the invention. Examples of suitable zeolites include, but are not limited to, those disclosed in Kirk-Othmer Encyclopedia of Chemical Technology, third edition, volume 15 (John Wiley & Sons, New York, 1991). The presently preferred zeolite is a beta zeolite, especially one having a framework topology identified as BEA.

The composition of the invention can also comprise, or consist essentially of, or consist of, an alumina- or silica-bound beta zeolite (first zeolite composition) and a second zeolite composition having a medium pore size wherein the second zeolite is not physically, or intimately, blended or mixed before binding with the beta zeolite. Preferably the second zeolite is silylated with a silylating agent. The first zeolite composition and the second zeolite composition can be packed such that they are not physically connected, mixed, or blended. Though both zeolite compositions can be present in any physical form and shape, it is preferred that they are in a substantially cylindrical form having a diameter of about 0.005 cm to about 3 cm and a length of about 0.1 cm to about 10 cm. They can also be physically separated by an inert or a substantially inert substance such as, for example, glass beads, glass wool, low surface silica, low surface alumina, clay, or combinations of two or more thereof. They can also be placed in two separate reactors, or vessels, for use in a hydrotreating process such as hydrodealkylation, transalkylation, isomerization, disproportionation, or combinations of two or more thereof.

Any commercially available zeolite can be employed as a second zeolite of the invention. Examples of suitable zeolites include, but are not limited to, those disclosed in Kirk-Othmer Encyclopedia of Chemical Technology described above. The second zeolite can also be characterized by having the following physical characteristics: a surface area as determined by the BET method using nitrogen in the range of from about 300 to about 600, preferably 350 to 500 $m^2/g$; a pore volume in the range of from about 0.4 to about 0.8, preferably about 0.5 to about 0.75, and most preferably 0.6 to 0.75 ml/g; an average pore diameter in the range of from about 70 to about 300, preferably about 100 to about 250, and most preferably 125 to 200 Å; and a porosity of more than about 50%. The presently preferred zeolites are those having medium pore sizes having the physical characteristics disclosed above. ZSM-5 and similar zeolites that have been identified as having a framework topology identified as MFI are particularly preferred because of their shape selectivity.

The composition of the invention can be produced by any methods known to one skilled in the art. However, it is preferred that the composition of the invention be produced by the second embodiment of the invention.

The weight ratio of the second zeolite to the first zeolite can be any ratio so long as the ratio can effectively reduce the concentration of ethylbenzene in the product stream of the first stage transalkylation process disclosed in the third embodiment of the present invention. Generally the ratio can be in the range of from about 0.1:1 to about 10:1, preferably about 0.5:1 to about 3:1, and most preferably about 0.7:1 to about 2:1.

The first zeolite composition and second zeolite composition can be produced by any method known to one skilled in the art. However, it is preferred that the first zeolite composition and the second zeolite composition be produced by the process disclosed in the second embodiment of the invention. In the disclosure of the second embodiment of the invention, for the interest of brevity, the first zeolite and second zeolite are described as "a zeolite".

According to the second embodiment of the invention, a zeolite, can be optionally contacted with one or more suitable binders in a liquid, preferably aqueous medium, to form a zeolite-binder mixture. Any binders known to one skilled in the art for use with a zeolite are suitable for use herein. Examples of suitable binder include, but are not limited to, clays such as for example, kaolinite, halloysite, vermiculite, chlorite, attapulgite, smectite, montmorillonite, illite, saconite, sepiolite, palygorskite, diatomaceous earth, and combinations of any two or more thereof; aluminas such as for example α-alumina and γ-alumina; silicas; alumina-silica; aluminum phosphate; aluminum chlorohydrate; and combinations of any two or more thereof Because these binders are well known to one skilled in the art, description of which is omitted herein. The weight ratio of a zeolite to a binder can be in a wide range and generally in the range of from about 200:1 to about 0.1:1, preferably 100:1 to 0.01:1.

The zeolite and the binder can be well mixed by any means known to one skilled in the art such as stirring, blending, kneading, or extrusion, following which the zeolite-binder mixture can be dried in air at a temperature in the range of from about 20 to about 200° C., preferably about 25 to about 175° C., and most preferably 25 to 150° C. for about 0.5 to about 50 hours, preferably about 1 to about 30 hours, and most preferably 1 to 20 hours, preferably under atmospheric pressure. Thereafter, the dried, zeolite-binder mixture can be further calcined, if desired, in air at a temperature in the range of from about 300 to 1000° C., preferably about 350 to about 750° C., and most preferably 450 to 650° C. to prepare a calcined zeolite-binder. If a binder is not desired, a zeolite can also be calcined under similar conditions to remove any contaminants, if present.

A zeolite, a calcined zeolite, or a calcined zeolite-binder can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite with predominantly ammonium ions. Techniques for such treatment are well known to one skilled in the art such as, for example, ion exchange with the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 200, preferably about 0.1 to about 150, more preferably about 1 to about 100, and most preferably 5 to 75 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined zeolite. The drying and calcining processes can be carried out substantially the same as those disclosed above for the preparation of a calcined zeolite or zeolite-binder.

Generally, the ammonium-exchanged zeolite becomes hydrogen exchanged upon calcination or high temperature treatment such that a predominant proportion of its exchangeable cations are hydrogen ions. The above-described ion exchanges of exchangeable ions in a zeolite is well known to one skilled in the art. See, for example, U.S. Pat. No. 5,516,956, disclosure of which is incorporated herein by reference. Because the ion exchange procedure is well known, the description of which is omitted herein for the interest of brevity.

According to the second embodiment of the invention, a zeolite in a desired ionic form, regardless whether calcined or containing a binder, can be optionally contacted with steam under a condition sufficient to effect the formation of steamed zeolite. Generally the steam temperature can be in the range of from about 120° C. to about 1500° C., preferably about 200° C. to about 1000° C., more preferably 250° C. to 800° C., and most preferably 350 to 625° C. The contact period can be as short as 5 minutes to as long as about 30 hours, preferably about 30 minutes to 20 hours, and most preferably 1 hour to 10 hours. The treatment can be carried out under a pressure that can maintain or accommodate the steam temperature in the range of from about atmospheric pressure to about 2,000, preferably to about 1,500, and most preferably to 1000 psig.

According to the second embodiment of the invention a zeolite, whether it has been steamed or not, also can be treated with an acid. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to sulfuric acid, hydrochloric acid, nitric acid, phosphoric acid, formic acid, acetic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of any two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations thereof. The presently preferred acids are hydrochloric acid and nitric acid for they are readily available.

Any methods known to one skilled in the art for treating a solid catalyst with an acid can be used in the acid treatment of the present invention. Generally, a zeolite material can be suspended in an acid solution. The concentration of the zeolite in the acid solution can be in the range of from about 0.01 to about 500, preferably about 0.1 to about 400, more preferably about 1 to about 350, and most preferably 5 to 300 grams per liter. The amount of acid required is the amount that can maintain the solution in acidic pH during the treatment. Preferably the initial pH of the acid solution containing a zeolite is adjusted to lower than about 7, preferably lower than about 6, and most preferably lower than 5. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as the acid for reducing the alumina content in a zeolite. The mild acid treatment can be carried out under substantially the same conditions disclosed in the acid treatment for reducing alumina content in a zeolite. Thereafter, the resulting solid can be washed and dried as disclosed above.

The dried, acid-leached zeolite, whether it has been further washed with a mild acid or not, can be calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

Thereafter, a zeolite, or steamed zeolite, or acid-leached zeolite, whether it has been calcined or not, can be incorporated therein or impregnated thereon with a metal compound whose a metal selected from the group consisting of nickel, palladium, molybdenum, gallium, platinum, tin, chromium, rhodium, rhenium, tungsten, indium, cobalt, germanium, zirconium, titanium, ruthenium, and combinations of any two or more thereof. Any metal compound that can promote the incorporating or impregnating of the acid-leached zeolite with the metal of the metal compound can be employed in the present invention.

Generally, any platinum-containing compound that can promote the combining of platinum element with an aluminosilicate can be employed herein. Examples of suitable platinum-containing compounds include, but are not limited to, chloroplatinic acid ($H_2PtCl_6 \cdot xH_2O$), platinum (IV) chloride (platinic chloride), platinum (II) bromide, platinum (II) iodine, tetramine platinum (II) chloride ($Pt(NH_3)_4Cl_2 \cdot H_2O$ or $Pt(NH_3)_4Cl_2$), tetramine platinum (II) nitrate ($Pt(NH_3)_4(NO_3)_2$), tetramine platinum (II) hydroxide ($Pt(NH_3)_4(OH)_2$), tetrachlorodiamine platinum (IV), and combinations of any two or more thereof. The presently preferred platinum-containing compound is chloroplatinic acid for it is readily available.

Similarly, examples of suitable tin-containing compound include, but are not limited to, stannous acetate, stannic acetate, stannous bromide, stannic bromide, stannous chloride, stannic chloride, stannous oxalate, stannous sulfate, stannic sulfate, stannous sulfide, and combinations of any two or more thereof.

Examples of suitable titanium-containing compounds include, but are not limited to, zinc titanate, lanthanum titanate, titanium tetramide, titanium tetramercaptide, titanium tetrabutoxide, titanium tetramethoxide, titanium tetraethoxide, titanium tetrapropoxide, titanium tetrachloride, titanium trichloride, titanium bromides, and combinations of any two or more thereof.

Similarly, examples of suitable zirconium-containing compounds include, but are not limited to, zirconium acetate, zirconium formate, zirconium chloride, zirconium bromide, zirconium butoxide, zirconium tert-butoxide, zirconium citrate, zirconium ethoxide, zirconium methoxide, zirconium propoxide, and combinations of any two or more thereof.

Examples of suitable germanium-containing compounds include, but are not limited to, germanium chloride, germanium bromide, germanium ethoxide, germanium fluoride, germanium iodide, germanium methoxide, and combinations of any two or more thereof.

Examples of suitable indium-containing compounds include, but are not limited to, indium acetate, indium bromide, indium chloride, indium fluoride, indium iodide, indium nitrate, indium phosphide, indium selenide, indium sulfate, and combinations of any two or more thereof.

Examples of suitable lanthanum-containing compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, lanthanum titanate, and combinations of any two or more thereof.

Examples of other suitable metal compounds include, but are not limited to, molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum(VI) tetrachloride oxide, ammonium tetrathiomolybdate, chromium(II) acetate, chromium (III) acetate, chromium(III) acetylacetonate, chromium(II) chloride, chromium(III) chloride, chromium(II) fluoride, chromium(III) fluoride, chromium hexacarbonyl, chromium (III) nitrate, chromium nitride, chromium(III) 2,4-pentanedionate, chromium(III) perchlorate, chromium(III) potassium sulfate, chromium(III) sulfate, chromium(III) telluride, cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(III) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, nickel(II) acetate, nickel(II) acetylacetonate, nickel(II) bromide, nickel(II) carbonate, nickel(II) chloride, nickel(II) nitrate, nickel(II) perchlorate, nickel phosphide, nickel(II) sulfate, nickel sulfide, nickel(II) titanate, palladium(II) acetate, palladium(II) acetylacetonate, palladium(II) bromide, palladium(II) iodide, palladium(II) nitrate, palladium(II) sulfate, palladium(II) sulfide, rhodium(III) acetate, rhodium (III) acetylacetonate, rhodium(III) bromide, rhodium(III) chloride, rhodium(III) nitrate, rhodium(III) octanoate, rhodium(III) phosphate, rhodium(III) sulfate, rhenium nitrate, rhenium sulfate, tungsten(V) bromide, tungsten(IV) chloride, tungsten(VI) chloride, tungsten hexacarbonyl, tungsten(VI) oxychloride, tungsten(IV) sulfide, tungstic acid, and combinations of any two or more thereof.

The presently preferred metal compound is an ammonium molybdate for it is readily available and effective for incorporating Mo into a zeolite.

A metal-promoted or metal-impregnated zeolite can be prepared by any suitable, effective means so long as the resulting zeolite can be used in the process of the present invention. Preferably, a zeolite or acid-leached zeolite, which can have been compounded with a binder as described above and can have been shaped by any means known in the art such as, for example, pelletized, extruded, tableted, or combinations of two or more thereof, can be impregnated such as, for example, by incipient wetness method with a solution, containing a suitable metal compound disclosed above under a condition well known to one skilled in the art such as, for example, at about 25° C. for about 1 minute to about 10 hours under atmospheric pressure. The concentrations of the metal compound in the impregnating solution and the weight ratio of this solution to the zeolite are chosen such as to provide a finished, metal-impregnated, acid-leached zeolite which contains the desired content of metal which can effect the reduction of coke deposition on the surface of the composition of the present invention as disclosed above in the first embodiment of the present invention. Because the impregnation process is well known to one skilled in the art, the description of which is omitted herein.

After the incorporation or impregnation with a metal compound has been completed, the metal-impregnated zeolite can then be dried, as disclosed above and then calcined. Generally the calcination is carried out in air under the pressure range disclosed above for calcining the acid-leached zeolite. The calcination can also be carried out at a temperature in the range of about 300 to about 1000° C. for about 1 to about 30 hours, preferably about 400° C. to about 800° C. for 1 to about 20 hours, and most preferably 450° C. to 650° C. for 2 to 15 hours.

The calcined, metal-impregnated zeolite can then be treated with a reducing agent to reduce the oxidation state of the metal. For example, if the metal is platinum, the oxidation state of platinum can be reduced to 0. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 550° C. for 1 to 5 hours. If the calcined, metal-impregnated zeolite is not first treated with a reducing agent, the composition of the present invention can be treated with a reducing agent as described herein prior to use of the composition of the invention.

According to the present invention, the second zeolite is preferably promoted with a promoter which can be carried out at any stage during the process for producing the second zeolite composition. Generally, a zeolite can be contacted with a promoter precursor compound, preferably in a solution or suspension, under a condition known to those skilled in the art to incorporate a promoter precursor compound into a zeolite. Preferably the promoter precursor compound is impregnated onto the zeolite. Because the methods for incorporating or impregnating a promoter precursor compound into a zeolite such as, for example, impregnation by incipient wetness method, are well known to those skilled in the art, the description of which is also omitted herein for the interest of brevity.

According to the present invention, any promoter precursor compound, which upon being incorporated into, or impregnated or coated onto, a zeolite, can be converted into a promoter, as disclosed in the first embodiment of this invention, upon calcining, under the conditions disclosed above, can be used in the present invention. Presently it is preferred that a promoter precursor be selected from the group consisting of silicon-containing compounds, sulfur-containing compounds, phosphorus-containing compounds, and combinations of two or more thereof.

Generally any silicon-containing compounds which can be converted to a silicon oxide that are effective to enhance hydrodealkylation of a $C_9$+aromatic compound when used with a zeolite can be used in the present invention. Examples of suitable silicon-containing compounds can have a formula of $(R)(R)(R)Si\text{-}(O_mSi(R)(R))_n\text{-}R$ wherein each R can be the same or different and is independently selected from the group consisting of alkyl radicals, alkenyl radicals, aryl radicals, alkaryl radicals, aralkyl radicals, and combinations of any two or more thereof; m is 0 or 1; and n is 1 to about 10 wherein each radical can contain 1 to about 15, preferably 1 to about 10 carbon atoms per radical. Specific examples of such polymers include, but are not limited to, silicon-containing polymers such as poly(phenylmethyl)siloxane, poly(phenylethylsiloxane), poly(phenylpropylsiloxane), hexamethyldisiloxane, decamethyltetrasiloxane, diphenyltetramethyldisiloxane, and combinations of two or more thereof. Other silicon-containing compounds include organosilicates such as, for example, tetraethyl orthosilicate, tetrabutyl orthosilicate, tetrapropyl orthosilicate, or combination of two or more thereof. A number of well known silylating agents such as trimethylchlorosilane, chloromethyldimethylchlorosilane, N-trimethylsilylimidazole, N,O-bis(trimethylsilyl) acetimide, N-methyl-N-trimethylsilyltrifluoroacetamie, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, [3-(2-aminoethyl) aminopropyl]trimethoxysilane, cyanoethyltrimethoxysilane, aminopropyltriethoxysilane, phenyltrimethoxysilen, (3-chloropropyl)trimethoxysilane, (3-mercaptopropyl) trimethoxysilane, (3-glycidoxypropyl)trimethoxysilane, vinyltris(β-methoxyethoxy)silane, (γ-methacryloxypropyl) trimethoxysilane, vinylbenzyl cationic silane, (4-aminopropyl)triethoxysilane, [γ-(β-aminoethylamino) propyl]trimethoxysilane, (γ-glycidoxypropyl) trimethoxysilane, [β-(3,4-epoxycyclohexyl)ethyl] trimethoxysilane, (β-mercaptoethyl)trimethoxysilane, (γ-chloropropyl)trimethoxysilane, and combinations of two or more thereof can also be employed. The presently preferred silicon-containing compounds are tetraethyl orthosilicate and poly(phenylmethyl) siloxane.

Similarly, any phosphorus-containing compounds that, when impregnated onto or incorporated into a zeolite can be converted into a phosphorus oxide can be used in the present invention. Examples of suitable phosphorus-containing compounds include, but are not limited to, phosphorus pentoxide, phosphorus oxychloride, phosphoric acid, organic phosphates, phosphite, phosphines having the formula of $P(OR)_3$, $P(O)(OR)_3$, $P(O)(R)(R)(R)$, $P(R)(R)(R)$, and combinations of two or more thereof wherein R is the same as that disclosed above. Examples of suitable organic phosphates include, but are not limited to, trimethylphosphate, triethylphosphate, tripropylphosphate, and combination of two or more thereof. The presently preferred organic phosphates are trimethylphosphate and triethylphosphate for they are readily available.

According to the present invention, any sulfur-containing compound that can be converted to a sulfur oxide upon calcining can be employed in the present invention. Example of suitable sulfur containing compounds include, but are not limited to, $(RSH)_n$, $RS_nR$, $RS(O)R$, $RS(O)(O)R$, $M_zS$, $SX_z$, $SO_zX_z$, $CO_mS_z$, $M_zH_mSO_4$, or combinations of two or more thereof wherein each R, m, and n are the same as those disclosed above, z is a number that fills the proper valency of M or X in which M is an alkali metal ion, an alkaline earth metal ion, an ammonium ion, or H, and X is a halogen or hydrogen. Specific examples of sulfur-containing compounds include, but are not limited to, ammonium sulfide, sodium sulfide, ammonium hydrogen sulfate, sodium hydrogen sulfide, potassium hydrogen sulfide, dimethyl disulfide, methyl mercaptan, diethyl disulfide, dibutyl trisulfide, sulfuryl chloride, sulfur monochloride, dinonyl tetrasulfide, hydrogen sulfide, carbon disulfide, carbonyl sulfide, sulfonyl chloride, or combinations of two or more thereof.

Upon completion of the above-described treatment or impregnation of a zeolite, regardless of whether it has been acid-leached zeolite, with a metal compound, a metal-promoted zeolite composition is produced which can then be used in the third embodiment of the present invention.

According to the third embodiment of the present invention, a process useful for converting a hydrocarbon, preferably a $C_9$+aromatic compound, to a mixture rich in $C_6$ to $C_8$ aromatic hydrocarbons comprises, consists essentially of, or consists of contacting a fluid stream with a catalyst composition, optionally in the presence of an inert gas or a hydrogen-containing fluid, under a condition sufficient to enhance or effect the conversion of a hydrocarbon to a mixture rich in $C_6$ to $C_8$ aromatic hydrocarbons wherein said fluid stream comprises a hydrocarbon or hydrocarbon mixture which can comprise $C_9$+aromatic compounds, paraffins, olefins, naphthenes. The catalyst composition is the same as that disclosed in the first embodiment of the invention which can be prepared by the second embodiment of the invention.

The term "fluid" is used herein to denote gas, liquid, vapor, or combinations thereof. The term "enhance" refers to an increased BTX or xylenes in the product employing the catalyst composition as compared to employing an untreated zeolite. Examples of a hydrocarbon include, but are not limited to, butane, isobutanes, pentane, isopentanes, hexane, isohexanes, cyclohexane, methylcyclohexane, heptane, isoheptanes, octane, isooctanes, nonanes, decanes, undecanes, dodecanes, tridecanes, tetradecanes, pentadecanes, hexadecanes, butenes, isobutene, pentenes, hexenes, 1,2,3-trimethylbenzene, 1,2,4-trimethylbenzene, 1,3,5-trimethylbenzene, 1,2,3,4-tetramethylbenzene, 1,2,3, 5-tetramethylbenzene, 1,2,4,5-tetramethylbenzene, n-propylbenzene, 3-ethyltoluene, 4-ethyltoluene, 3-n-propyltoluene, 4-n-propyltoluene, 1,3-diethylbenzene, naphthalenes, and combinations of any two or more thereof. In some feed fluids, such as, for example, gasoline can comprise some benzene, toluene, ethylbenzene, and xylenes.

Any fluid which contains a $C_9$+aromatic compound can be used as the feed for the process of this invention.

Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins, cycloalkanes, and aromatic compounds.

Any fluid which contains a $C_9$+aromatic compound as disclosed above can also be used as the feed for the process of this invention. A $C_9$+aromatic compound can have the formula of $R'_q Ar$ wherein each $R'$ is a hydrocarbyl radical having 1 to about 15 carbon atoms and is independently selected from the group consisting of alkyl radicals, aryl radicals, alkaryl radicals, aralkyl radicals, alkenyl radicals, and combinations of any two or more thereof, q is a whole number from 1 to 5, and Ar is a phenyl group. The origin of the $C_9$+aromatic compounds feed is not critical. However, a preferred fluid feed is a $C_9$+aromatic compound derived from the heavies fraction of a product from a paraffin, in particular gasoline, aromatization reaction. Generally, this heavies fraction contains primarily trimethylbenzenes such as 1,2,3-trimethylbenzene, 1,2,4-trimethylbenzene, and 1,3,5-trimethylbenzene; tetramethylbenzenes such as 1,2,3,4-tetramethylbenzene, 1,2,3,5-tetramethylbenzene and 1,2,4,5-tetramethylbenzene; and naphthalenes. Additionally, n-propylbenzene, 3-ethyltoluene, 4-ethyltoluene, 3-n-propyltoluene, 4-n-propyltoluene, and 1,3-diethylbenzene can also be present in the fluid.

In a hydrodealkylation process benzene, toluene, ethylbenzene and xylenes are generally substantially absent from the fluid, i.e., the amount of each of these aromatic hydrocarbons is less than about 0.1 weight % in the fluid. However, in a transalkylation process, one or more of benzene, toluene, ethylbenzene and xylenes can be present in the feed to effect a significant alkylation of the lower aromatic hydrocarbons by the $C_9$+aromatic compounds, i.e., significant transalkylation occurs. The condition for carrying out hydrodealkylation and transalkylation can be substantially the same as disclosed hereinbelow.

Any hydrogen-containing fluid which comprises, consists essentially of, or consists of, molecular hydrogen ($H_2$) can be used in the process of this invention. This hydrogen-containing fluid can therefore contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of any two or more thereof, or any other fluid which does not significantly affect the process or the catalyst composition used therein.

The contacting of a fluid feed stream containing a hydrocarbon with a hydrogen-containing fluid in the presence of the catalyst composition can be carried out in any technically suitable manner, in a batch or semicontinuous or continuous process, under a condition effective to convert a hydrocarbon to a $C_6$ to $C_8$ aromatic hydrocarbon. Generally, a fluid stream as disclosed above, preferably being in the vaporized state, is introduced into a suitable hydroprocessing reactor having a fixed catalyst bed, or a moving catalyst bed, or a fluidized catalyst bed, or combinations of any two or more thereof by any means known to one skilled in the art such as, for example, pressure, meter pump, and other similar means. Because a hydroprocessing reactor and process therewith are well known to one skilled in the art, the description of which is omitted herein for the interest of brevity. The condition of the process of the invention can include a weight hourly space velocity of the fluid feed stream in the range of about 0.01 to about 100, preferably about 0.05 to about 50, and most preferably 0.1 to 30 g feed/g catalyst/hour. The hydrogen-containing fluid (gas) hourly space velocity generally is in the range of about 1 to about 10,000, preferably about 5 to about 7,000, and most preferably 10 to 10,000 ft³ $H_2$/ft³ catalyst/hour. Generally, the pressure can be in the range of from about 10 to about 2000 psig, preferably about 100 to about 1000 psig, and most preferably 200 to 750 psig, and the temperature is about 250 to about 1000° C., preferably about 300 to about 750° C., and most preferably 400 to 650° C.

The process effluent generally contains a light gas fraction comprising hydrogen and methane; a $C_2$–$C_3$ fraction containing ethylene, propylene, ethane, and propane; an intermediate fraction including non-aromatic compounds having greater than 3 carbon atoms; a BTX aromatic hydrocarbons fraction (benzene, toluene, ortho-xylene, meta-xylene and para-xylene); and a $C_9$+fraction which contains aromatic compounds having 9 or more carbon atoms per molecule. Generally, the effluent can be separated into these principal fractions by any known methods such as, for example, fractionation distillation. Because the separation methods are well known to one skilled in the art, the description of which is omitted herein. The intermediate fraction can be fed to an aromatization reactor to be converted to aromatic hydrocarbons; methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

The product stream (hereinafter referred to as first product stream) in the above-described transalkylation or hydrodealkylation process frequently contained an undesirably high ethylbenzene content. According to the process of the invention, the first product stream can further be converted to a desirable $C_6$ to $C_8$ hydrocarbon, i.e., benzene, toluene, or xylene, by a second stage hydrotreating process such as transalkylation, disproportionation, isomerization, or hydrodealkylation process to substantially reduce the ethylbenzene in the first product stream. The term "substantially" as used herein is referred to as "more than trivial".

The second stage transalkylation, disproportionation, isomerization, or hydrodealkylation process comprises, consists essentially of, or consists of contacting the first product stream with a second catalyst composition. The second catalyst composition preferably comprises a ZSM-5 zeolite as disclosed hereinabove. The process of the second stage transalkylation, disproportionation, isomerization, or hydrodealkylation process can be substantially the same as that disclosed above in the third embodiment of the invention and, for the interest of brevity, is omitted herein. The second stage product stream generally also contains the fractions disclosed above and, as disclosed in the Examples, contains substantially lower concentration of ethylbenzene than the first product stream.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 1000° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the effect of the treatment of a beta zeolite material with steam essentially according to the second embodiment of the invention.

A commercial beta zeolite BEA (alumina bound; zeolite/alumina ratio=70/30 by weight), which was provided by UOP (Des Plains, Ill.) as 1/16 inch extrudes, was used in the Examples. This material (10 g) was impregnated with an ammonium molybdate solution containing 0.375 g ammonium molybdate ($(NH_4)_6Mo_7O_{24} \cdot 4H_2O$) and 6 g $H_2O$ by the well known incipient wetness method at about 25° C. The ammonium molybdate-impregnated beta zeolite was then calcined in air (muffle furnace) for 6 hours at 538° C. to produce 10.01 g of catalyst A containing 2.036 weight % molybdenum by calculation.

A zeolite Beta obtained from CU Chemie Uetikon AG, Uetikon, Switzerland, having a product designate of Zeocat H-Beta (obtained as powder) was also used in the preparation of other catalyst compositions of the invention. Fifty g of the zeolite was well mixed with 50 g of silica (Ludox AS-40, obtained from DuPont, Wilmington, Del.) followed by adding just enough water to make a paste. The paste was dried at 125° C. in an oven (for 3 hours). The dried zeolite-silica was then subject to calcining at 538° C. for 5 hours in a muffle furnace to produce 58.74 g of a calcined silica-bound zeolite containing 30 weight % silicon oxide by calculation. A portion (5.09 g) of the calcined zeolite-silicon oxide was then impregnated with 3.48 g of 6 weight % aqueous ammonium molybdate ($(NH_4)_6Mo_7O_{24} \cdot 4H_2O$) solution followed by calcining at 538° C. for 5 hours to produce 5.17 g of Mo-promoted zeolite (catalyst B) containing 2.195 weight % Mo.

In a separate run, 10 g of the Zeocat H-Beta zeolite powder, 10 g of a HZSM-5 (PZ-2/50H; also obtained from CU Chemie Uetikon as powder), and 20 g of the Ludox AS-40 silica were mixed to form a mixture. Water as added to the mixture in a quantity just enough to form a paste. The paste was extruded to 1/16 inch extrudates which were dried in an oven at 125° C. for 3 hours. The dried extrudates were then calcined at 538° C. for 6 hours to produce 23.55 g of physically-mixed zeolite containing beta zeolite and ZSM-5 zeolite. A portion (5 g) of this physically-mixed zeolite was impregnated with 3.80 g of 6.57 weight % ammonium molybdate solution and, following drying at room temperature (25° C.) for 8 hours, then calcined at 538° C. for 6 hours to produce 5.13 g of Mo-promoted zeolite containing physically-mixed beta zeolite and ZSM-5 zeolite (catalyst C) which contained 2.645 weight % Mo.

Also in a separate run, 50 g of the powder Zeocat beta zeolite employed in producing catalyst B was mixed with 50 g of alumina to form a mixture. Acetic acid (10 weight %; 83 g) was added to the mixture to make a paste. The paste was extruded into 1/16" extrudate and then air-calcined at 538° C. for 6 hours to produce 67.8 g of a alumina-bound beta zeolite. The alumina-bound beta zeolite was impregnated with 2.07 g of a 6.57 weight % ammonium molybdate solution followed by calcining at 538° C. for 6 hours to produce 2.93 g of a Mo-promoted, alumina-bound beta zeolite (catalyst D) containing 2.522 weight % of Mo by calculation.

Still in a separate run, 25 g of PZ-2/50H zeolite and 25 g of Ludox AS-40 silica were well mixed with minimal amount of water to prepare a paste which, following drying in an oven for 3 hours at 125° C., was calcined at 538° C. for 6 hours to produce 27.58 g of silica bound ZSM-5 (catalyst E) containing 30 weight % silicon.

Further in a separate run, 50 g of the above-described PZ 2/50H ZSM-5 was well mixed with 10 g of poly (phenylmethyl)siloxane (PPMS) in 120 g normal pentane to form a silicon-modified ZSM-5 mixture. The mixture was dried in a rotavapor and then at 125° C. for 3 hours to evaporate pentane followed by calcining at 538° C. for 6 hours to produce a calcined zeolite. The calcined zeolite was then mixed with 50 g of Ludox AS-40 silica as described above followed by calcining (538° C., 6 hours) to produce 71.32 g of silicon-modified ZSM-5 (catalyst F).

EXAMPLE II

This example illustrates the use of the zeolite materials (catalysts A, B, C, D, E, and F) described in Example I in the transalklylation of a feed comprising $C_9$+aromatic compounds and toluene to produce a product containing a higher concentration of BTX than the feed. The composition of aromatic compounds, up to 12 carbon atoms per molecule, of the feed used for the transalkylation is shown in Table I. There were numerous unidentified components as well as paraffins and isoparaffins in the feed that are not shown in the calculation disclosed in Table I.

TABLE I

| Composition | | Weight % |
|---|---|---|
| Aromatics | Total | |
| | $C_6$ | 0.000 |
| | $C_7$ (toluene) | 50.248 |
| | $C_8$ | 0.411 |
| | $C_9$ | 11.315 |
| | $C_{10}$ | 12.664 |
| | $C_{11}$ | 9.457 |
| | $C_{12}$ | 3.001 |
| | Total | 87.096 |
| Sulfur (ppmw) | | 658 |

A stainless-steel reactor tube (inner diameter: 2.5 cm; length: 50 cm) was filled with a 20 cm bottom layer of Alundum® alumina (inert, low surface area alumina, provided by Norton Company, Worcester, Mass.), 5 ml of one of the beta zeolite materials described in Example I, and a 20 cm top layer of Alundum®. The reactor and its content were pre-heated from room 10 temperature to the desired reaction temperature of about 500° C. The zeolite materials (catalysts) were pretreated with flowing hydrogen gas at a rate of 260 ml per minute at 500° C. starting at 25° C. and ramping at 10° C./min. The reaction pressure was set at 500 psig. A liquid feed as shown in Table I was introduced into the heated reactor at a rate of 20 ml/hour, which was equivalent to a hourly space velocity of about 4 ml/ml catalyst/hour. The product, which exited the reactor, was cooled, analyzed by means of an online gas chromatograph at intervals of about 1 hour. Pertinent test results are summarized in Table II. Runs 5 and 6 represent a two stage transalkylation process in which the first catalyst composition (catlayst D) was packed as disclosed above and the second catalyst composition (catlayst E or F) was packed downstream and adjacent to the first catalyst composition. In other words, the second catalyst composition was packed between the first catalyst composition and the bottom layer of Alundum® alumina.

TABLE II+HU a

| Run | Catalyst[b] | Binder for Beta | % C$_9$+ Conv.[c] | % Naph Conv.[d] | Wt % Xyln's[e] | % EB/ Σ C$_8$[f] | Ave wt % Coke/ hr[g] |
|---|---|---|---|---|---|---|---|
| 1 | A (2.62) | alumina | 45.5 | 33.0 | 7.1 | 11.9 | 2.6 |
| 2 | B (2.53) | silica | 69.8 | 76.8 | 23.4 | 8.0 | 1.7 |
| 3 | C (1.76) | silica | 57.0 | 55.2 | 15.7 | 7.8 | 0.8 |
| 4 | D (2.68) | alumina | 74.6 | 80.4 | 26.0 | 6.2 | ND[h] |
| 5 | D (2.98) + E (2.02) | alumina | 73.0 | 81.7 | 28.1 | 6.4 | ND |
| 6 | D (3.04) + F (2.17) | alumina | 72.9 | 81.0 | 26.8 | 2.9 | ND |

[a]The time (hours) and temperature (° C.) of each run was: 1, 7.00 and 503; 2, 7.27 and 501; 3, 7.30 and 499; 4, 7.69 and 501; 5, 7.33 and 499; and 6, 7.43 and 497.
[b]The values in parentheses are the quantity (grams) of each catalyst used. Catalyst A, B, and D did not contain ZSM-5. In run 3, beta zeolite was physically mixed with ZSM-5. In runs 5 and 6, catalyst D was employed in the first stage transalkylation and catalyst E and F were used in the second stage and packed immediately after catalyst D such that the transalkylation product in the first stage was further transalkylated by catalyst E or F. The first stage catalyst D and secondstage catalyst E and F were separated by glass wool.
[c]Conversion of C$_9$ + aromatic compounds.
[d]Conversion of naphthalenes.
[e]Weight % of total xylenes in product stream.
[f]Weight % of ethylbenzene in product stream divided by total weight % C$_8$ aromatic hydrocarbons.
[g]Coke was determined at the end of the reaction by removing the catalysts from the reactor and determined with a thermal gravimetric analyzer (TGA), manufactured by TA Instruments, New Castle, Delaware.
[h]ND, not determined.

The results shown in Table II demonstrate that an alumina-bound beta zeolite obtained from UOP having impregnated thereon Mo had a relatively low weight % of xylenes produced, low C$_9$+conversion, and low naphthalene conversion (run 1). A silica-bound beta zeolite (Zeocat zeolite) promoted with Mo had higher conversion of C$_9$+aromatic compounds, including naphthalenes, to xylenes and a reduced coking rate in a transalkylation process (comparing run 2 with run 1). However, it was not known whether the discrepancy between runs 1 and 2 were due to the sources of starting beta zeolite materials. The results of run 3 demonstrate that a physical mixture of beta zeolite with ZSM-5 zeolite, when compared with run 2 (same source of starting beta zeolite material), reduced the conversion of C$_9$+aromatic compounds, including naphthalenes, to xylenes in a transalkylation process. Furthermore, the xylenes production and the ethylbenzene content were not as good as run 2. The results also show that a two-stage transalkylation in which a beta zeolite was used in the first stage followed by employing a ZSM-5 zeolite (run 6) significantly improved the conversion of C$_9$+aromatic compounds and naphthalenes to xylenes. Run 6 further shows that the ethylbenzene content was substantially reduced. The results for run 5 were not as good as run 6 in reduction of ethylbenzene because catalyst E was not silylated.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A catalyst system comprising a first catalyst composition and a second catalyst composition wherein said first catalyst composition and said second catalyst composition are present in separate stages; said stages are adjacent to each other but are not physically mixed or blended, said stages are under the same operating conditions; said first catalyst is a metal-promoted beta zeolite, and said second catalyst composition is a ZSM-5 zeolite having impregnated thereon an activity promoter selected from the group consisting of silicon, phosphorus, sulfur, and combinations of two or more thereof.

2. A catalyst system according to claim 1 wherein the metal in said metal-promoted beta zeolite is selected from the group consisting of nickel, palladium, molybdenum, gallium, platinum, copper, chromium, rhodium, rhenium, tungsten, cobalt, germanium, zirconium, titanium, ruthenium, and combinations of two or more thereof.

3. A catalyst system according to claim 2 wherein said metal is molybdenum.

4. A catalyst system according to claim 1 wherein said activity promoter is silicon.

5. A catalyst system according to claim 1 wherein the weight ratio of said second catalyst composition to said first catalyst composition is in the range of from about 0.1:1 to about 10:1.

6. A catalyst system according to claim 1 wherein the weight ratio of said second catalyst composition to said first catalyst composition is in the range of from about 0.7:1 to about 2:1.

7. A catalyst system comprising a first catalyst composition and a second catalyst composition wherein said first catalyst composition and said second catalyst composition are present in separate stages; said stages are adjacent to each other but are not physically mixed or blended; said stages are under the same operating conditions: said first catalyst is a metal-promoted beta zeolite, said second catalyst composition is a ZSM-5 zeolite having impregnated thereon an activity promoter selected from the group consisting of silicon, phosphorus, sulfur, and combinations of two or more thereof; the metal in said metal-promoted beta zeolite is selected from the group consisting of nickel, palladium, molybdenum, gallium, platinum, copper, chromium, rhodium, rhenium, tungsten, cobalt, germanium, zirconium, titanium, ruthenium, and combinations of two or more thereof; and the weight ratio of said second catalyst composition to said first catalyst composition is in the range of from about 0.1:1 to about 10:1.

8. A catalyst system according to claim 7 wherein said metal is molybdenum; said activity promoter is silicon; and the weight ratio of said second catalyst composition to said first catalyst composition is in the range of from about 0.7:1 to about 2:1.

9. A catalyst system according to claim 7 wherein said first catalyst composition and second catalyst composition are separated by a substantially inert material selected from the group consisting of glass beads, glass wool, low surface area silica, low surface alumina, clay, and combinations of two or more thereof.

10. A catalyst system according to claim 9 wherein said substantially inert material is glass wool.

11. A process comprising contacting a fluid, which comprises a hydrocarbon, with a catalyst system under a condition sufficient to effect the conversion of said hydrocarbon to a C$_6$ to C$_8$ aromatic hydrocarbon wherein said catalyst system comprising a first catalyst composition and a second catalyst composition; said first catalyst composition and said second catalyst composition are present in separate stages; said stages are adjacent to each other but are not physically mixed or blended; said stages are under the same operating conditions: said first catalyst is a metal-promoted beta zeolite; and said second catalyst composition is a ZSM-5 zeolite having impregnated thereon an activity promoter selected from the group consisting of silicon, phosphorus, sulfur, and combinations of two or more thereof.

12. A process according to claim 11 wherein the metal in said metal-promoted beta zeolite is selected from the group consisting of nickel, palladium, molybdenum, gallium, platinum, copper, chromium, rhodium, rhenium, tungsten, cobalt, germanium, zirconium, titanium, ruthenium, and combinations of two or more thereof.

13. A process according to claim 12 wherein said metal is molybdenum.

14. A process according to claim 11 wherein said activity promoter is silicon.

15. A process according to claim 11 wherein the weight ratio of said second catalyst composition to said first catalyst composition is in the range of from about 0.1:1 to about 10:1.

16. A process according to claim 11 wherein the weight ratio of said second catalyst composition to said first catalyst composition is in the range of from about 0.7:1 to about 2:1.

17. A process according to claim 11 wherein the metal in said metal-promoted beta zeolite is selected from the group consisting of nickel, palladium, molybdenum, gallium, platinum, copper, chromium, rhodium, rhenium, tungsten, cobalt, germanium, zirconium, titanium, ruthenium, and combinations of two or more thereof, and the weight ratio of said second catalyst composition to said first catalyst composition is in the range of from about 0.1:1 to about 10:1.

18. A process according to claim 11 wherein said metal is molybdenum; said activity promoter is silicon; and the weight ratio of said second catalyst composition to said first catalyst composition is in the range of from about 0.7:1 to about 2:1.

19. A process according to claim 11 wherein said first catalyst composition and second catalyst composition are separated by a substantially inert material selected from the group consisting of glass, glass wool, low surface area silica, low surface alumina, clay, and combinations of two or more thereof.

20. A process according to claim 11 wherein said substantially inert material is glass wool.

21. A process according to claim 11 wherein said first catalyst composition and second catalyst composition are in two separate reactors.

22. A process comprising contacting a fluid, which comprises a hydrocarbon, with a catalyst system under a condition sufficient to effect the conversion of said hydrocarbon to a $C_6$ to $C_8$ aromatic hydrocarbon wherein said catalyst system comprising a first catalyst composition and a second catalyst composition wherein said first catalyst composition and said second catalyst composition are separated by an inert material selected from the group consisting of glass beads, glass wool, low surface area silica, low surface area alumina, and combinations of two or more thereof;

said first catalyst composition is produced by the steps comprising: (1) combining a beta zeolite with silica to form a beta zeolite mixture; (2) calcining said beta zeolite-silica mixture to produce a silica-bound beta zeolite; and (3) contacting said silica-bound beta zeolite with a metal compound under a condition effective to incorporate said metal compound or the metal into said silica-bound beta zeolite to produce said metal-promoted beta zeolite; and said second catalyst composition is a ZSM-5 zeolite having incorporated therein an activity promoter selected from the group consisting of silicon, phosphorus, sulfur, and combinations of two or more thereof.

23. A process according to claim 22 wherein the metal of said metal compound is selected from the group consisting of nickel, palladium, molybdenum, gallium, platinum, tin, chromium, rhodium, rhenium, tungsten, indium, cobalt, germanium, zirconium, titanium, ruthenium, and combinations of any two or more thereof.

24. A process according to claim 22 wherein the metal of said metal compound is molybdenum.

25. A process according to claim 22 wherein said metal compound is ammonium molybdate.

* * * * *